United States Patent
Wang et al.

(10) Patent No.: US 12,442,012 B2
(45) Date of Patent: Oct. 14, 2025

(54) METHOD AND BIOLOGICAL AGENT FOR CATALYZING ESTERIFICATION OF PLANT FREE CAROTENOIDS AND TRANSGENIC PLANT

(71) Applicant: SOUTH CHINA BOTANICAL GARDEN, CHINESE ACADEMY OF SCIENCES, Guangdong (CN)

(72) Inventors: Ying Wang, Guangdong (CN); Shaohua Zeng, Guangdong (CN); Shuang Lin, Guangdong (CN)

(73) Assignee: SOUTH CHINA BOTANICAL GARDEN, CHINESE ACADEMY OF SCIENCES, Guangdong (CN)

( * ) Notice: Subject to any disclaimer, the term of this patent is extended or adjusted under 35 U.S.C. 154(b) by 163 days.

(21) Appl. No.: 18/154,861

(22) Filed: Jan. 16, 2023

(65) Prior Publication Data

US 2023/0295647 A1 Sep. 21, 2023

(30) Foreign Application Priority Data

Mar. 1, 2022 (CN) .......................... 202210192259.5

(51) Int. Cl.
*C12N 15/82* (2006.01)
*C12N 9/10* (2006.01)

(52) U.S. Cl.
CPC ......... *C12N 15/825* (2013.01); *C12N 9/1029* (2013.01); *C12Y 203/01* (2013.01)

(58) Field of Classification Search
CPC ... C12N 15/825; C12N 9/1029; C12Y 203/01
See application file for complete search history.

(56) References Cited

U.S. PATENT DOCUMENTS

2002/0177181 A1 11/2002 Kanner et al.

FOREIGN PATENT DOCUMENTS

WO 02094982 11/2002

OTHER PUBLICATIONS

Nonaka et al. Truncation and pathogenic mutations facilitate the formation of intracellular aggregates of TDP-43. Hum Mol Genet. Sep. 15, 2009;18(18):3353-64. doi: 10.1093/hmg/ddp275. PMID: 19515851. (Year: 2009).*

Watkins, J. L., Li, M., McQuinn, R. P., Chan, K. X., McFarlane, H. E., Ermakova, M., . . . & Pogson, B. J. (2019). A GDSL esterase/lipase catalyzes the esterification of lutein in bread wheat. The Plant Cell, 31(12), 3092-3112. (Year: 2019).*

Xiaofei Shen et al., "Characterization of proanthocyanin-related leucoanthocyanidin reductase and anthocyanidin reductase genes in Lycium ruthenicum Murr.", Journal of Chinese Pharmaceutical Sciences, Jun. 2014, pp. 369-377.

Xuhui Kan et al., "Ultrasonic-assisted extraction and high-speed counter-current chromatography purification of zeaxanthin dipalmitate from the fruits of *Lycium barbarum* L.", Food Chemistry, Apr. 2020, pp. 1-8.

Jiang Wu et al., "Cloning and characterization of a novel β-carotene hydroxylase gene from Lycium barbarum and its expression in *Escherichia coli*", Biotechnology and Applied Biochemistry, May 2014, pp. 637-645.

Shuang Lin et al. "Integrative Analysis of Transcriptome and Metabolome Reveals Salt Stress Orchestrating the Accumulation of Specialized Metabolites in *Lycium barbarum* L. Fruit", International Journal of Molecular Sciences, Apr. 2021, pp. 1-16.

Sanae Kishimoto et al., "Heterologous expression of xanthophyll esterase genes affects carotenoid accumulation in petunia corollas", Scientific Reports, Jan. 2020, pp. 1-13.

Harunobu Amagase et al. "A review of botanical characteristics, phytochemistry, clinical relevance in efficacy and safety of *Lycium barbarum* fruit (Goji)", Food Research International, Mar. 2011, pp. 1702-1717.

Achmad Subagio et al. "Carotenoids and Their Fatty-Acid Esters in Banana Peel", Journal of Nutritional Science and Vitaminology, Dec. 1996, pp. 553-566.

C. Mertz et al., "Characterization and thermal lability of carotenoids and vitamin C of tamarillo fruit (*Solanum petaceum* Cav.)", Food Chemistry, Mar. 2010, pp. 653-659.

Yongliang Liu et al., "Comparative analysis of carotenoid accumulation in two goji (*Lycium barbarum* L. and *L. ruthenicum* Murr.) fruits", BMC Plant Biology, Dec. 2014, pp. 1-14.

B. Stephen Inbaraj et al., "Determination of carotenoids and their esters in fruits of Lycium barbarum Linnaeus by HPLC-DAD-APCI-MS", Journal of Pharmaceutical and Biomedical Analysis, Apr. 2008, pp. 812-818.

Hongfei Fu et al., "Effect of esterification with fatty acid of b-cryptoxanthin on its thermal stability and antioxidant activity by chemiluminescence method", Food Chemistry, Mar. 2010, pp. 602-609.

Phyllis E. Bowen et al., "Esterification Does Not Impair Lutein Bioavailability in Humans", Human Nutrition and Metabolism, Sep. 2002, pp. 3668-3673.

Chung Yuen Cheng et al., "Fasting plasma zeaxanthin response to *Fructus barbarum* L. (wolfberry; Kei Tze) in a food-based human supplementation trial", British Journal of Nutrition, Jan. 2005, pp. 123-130.

Philipp Weller et al., "Identification and Quantification of Zeaxanthin Esters in Plants Using Liquid Chromatography Mass Spectrometry", Journal of agricultural and food chemistry, Oct. 2003, pp. 7044-7049.

(Continued)

*Primary Examiner* — Amjad Abraham
*Assistant Examiner* — Dequantarius Javon Speed
(74) *Attorney, Agent, or Firm* — JCIPRNET

(57) ABSTRACT

The present disclosure discloses three carotenoid esterases and the application of their encoding genes. The genes encoding the carotenoid esterase include: LbZAT1 gene with the nucleotide sequence as shown in SEQ ID NO:1, LbZAT2 gene with the nucleotide sequence as shown in SEQ ID NO:2, and/or LbZAT3 gene with the nucleotide sequence as shown in SEQ ID NO:3. The proteins encoded by the LbZAT1, LbZAT2 and LbZAT3 genes of the present disclosure have the function of catalyzing the esterification reaction between carotenoids containing free hydroxyl and fatty acid acyl donors. Carotenoid esterase and its encoding genes have important application value in the biosynthesis of esterified carotenoids in vitro.

6 Claims, 5 Drawing Sheets

Specification includes a Sequence Listing.

(56) References Cited

OTHER PUBLICATIONS

Jiao Zhang et al., "Optimization of enzyme-assisted extraction of the Lycium barbarum polysaccharides using response surface methodology", Carbohydrate Polymers, Jun. 2011, pp. 1089-1092.
B. Stephen Inbaraj et al., "Simultaneous determination of phenolic acids and flavonoids in Lycium barbarum Linnaeus by HPLC-DAD-ESI-MS", Journal of Pharmaceutical and Biomedical Analysis, Feb. 2010, pp. 549-556.
Judith Hempel et al., "Ultrastructural deposition forms and bioaccessibility of carotenoids and carotenoid esters from goji berries (*Lycium barbarum* L.)", Food Chemistry, Mar. 2017, pp. 525-533.
Bin Liang et al., "Water-soluble polysaccharide from dried Lycium barbarum fruits: Isolation, structural features and antioxidant activity", Carbohydrate Polymers, Feb. 2011, pp. 1947-1951.
Rachel A. Levin et al., "Relationships Within Tribe Lycieae (Solanaceae): Paraphyly of Lycium and Multiple Origins of Gender Dimorphism", American Journal of Botany, Dec. 2005, pp. 1-11.
"Chinese Pharmacopoeia", Pharmacopoeia Commission of the Ministry of Health, May 2020, pp. 1-454.
Chung Yuen Cheng et al., "Fasting plasma zeaxanthin response to *Fructus barbarum* L. wolfberry; Kei Tze) in a food-based human supplementation trial", British Journal of Nutrition, Feb. 2005, pp. 123-130.
Michael R. Green et al., "Molecular Cloning, a Laboratory Manual", Cold Spring Harbor Laboratory Press, Jun. 2012, pp. 1-34.

\* cited by examiner

METHOD AND BIOLOGICAL AGENT FOR CATALYZING ESTERIFICATION OF PLANT FREE CAROTENOIDS AND TRANSGENIC PLANT

CROSS-REFERENCE TO RELATED APPLICATION

This application claims the priority benefit of China application serial no. 202210192259.5, filed on Mar. 1, 2022. The entirety of the above-mentioned patent application is hereby incorporated by reference herein and made a part of this specification.

REFERENCE TO A SEQUENCE LISTING

The instant application contains a Sequencing Listing which has been submitted electronically in XML file and is hereby incorporated by reference in its entirety. Said XML copy, created on Dec. 21, 2022, is named 128351_sequencing-listing and is 20,084 bytes in size.

TECHNICAL FIELD

The present disclosure relates to the technical field of plant genetic engineering, in particular to a carotenoid esterase and the application of its encoding genes.

DESCRIPTION OF RELATED ART

*Lycium* L. is one kind of Solanaceae plants. The common species in China are *L.barbarum* L., *L.chinense* Mill. and *L.ruthenicum* Murr. (R. A. Levin and J. S. Miller, 2005).

According to the Chinese Pharmacopoeia, the dried and ripe fruit of *L.barbarum* L. is called "Goji", which can be used as medicine, and has functions of nourishing kidney, marrow, and liver, improving eyesight, and expelling wind. The vast majority of Chinese people's consumption of Goji is in the food market. It can be used not only as a snack food, but also as a raw material for beverages and dishes. In addition, with the gradual improvement of people's awareness of health care, the attention and demand of Goji as a health product has also increased dramatically. Moreover, Chinese medicine has been using Goji as a Chinese valuable herbal medicine and tonic for thousands of years. For Embodiments, Qiju Dihuang Pill and other Chinese herbal formulas contain Goji. In general, Goji berry has its irreplaceable importance and advantages in the fields of food, health products or traditional Chinese medicine.

The material basis for the efficacy of Goji berry mainly includes polysaccharides (Bin et al., 2011; Zhang et al., 2011), carotenoids (Liu et al., 2014), and polyphenol flavonoids (Amagase & Farnsworth, 2011; Inbaraj et al., 2010). Due to its high content and nutritional value, carotenoid plays an important role in the growth and effective ingredients accumulation of *L. barbarum*, and therefore have gained a lot of attention. 30%~50% of Goji berry carotenoids are zeaxanthin dipalmitate (ZD) (Amagase & Farnsworth, 2011). Compared with other plant tissues, Goji berry has the highest ZD content (Weller & Berithaupt, 2003), which reaches 0.36 mg/g (Judith et al., 2017) and 1.14 mg/g (Inbaraj et al., 2008) in fresh fruits and dried fruits respectively.

Free carotenoids are relatively stable in the natural environment, but they are prone to oxidation or E/Z tautomerism under high temperature or UV conditions. However, esterification enhanced the lipid solubility of carotenoids, which promotes their ability to bind lipoproteins, thus improving their tolerance to adverse conditions in the environment (Fu et al., 2010; Mertz et al., 2010). Therefore, esterified carotenoids are more stable than free carotenoids, and the higher the degree of esterification, the more stable the chemical properties of carotenoids are (Achmad et al., 1996).

Esterification also affects the location of carotenoids in liposomes and microsomes. Free lutein tends to be distributed in the periphery of liposomes or in the phospholipid layer. On the contrary, its mono-esterified and di-esterified products tend to stay in the interior of liposomes due to their high fat solubility (Bowen et al., 2002; Cheng et al., 2005). The location of carotenoids in liposomes and microsomes will affect their application. For example, zeaxanthin and zeaxanthin dipalmitate play the same active roles after entering the human body, but the latter one has more potential to be developed into innovative drugs because of its more stable structure and easier storage in liposomes and microsomes.

However, the genes encoding carotenoid esterase in *L. barbarum* have not been reported yet.

SUMMARY

Based on the above, the object of the present disclosure is to provide the application of genes encoding carotenoid esterase, which can express carotenoid esterase protein and thereby catalyzes the esterification of free carotenoids.

The first aspect of the present disclosure is to provide a method for catalyzing the esterification of plant free carotenoids, which comprises the following steps:
(a) preparing plant host cells;
(b) transforming the nucleic acid molecule encoding the carotenoid esterase into the host cells of (a), wherein the nucleic acid molecule is selected from:
  (i) LbZAT1 gene, with the nucleotide sequence of SEQ ID NO:1, or a nucleic acid sequence encoding the amino acid sequence of SEQ ID NO:4;
  (ii) LbZAT2 gene, with the nucleotide sequence of SEQ ID NO:2, or a nucleic acid sequence encoding the amino acid sequence of SEQ ID NO:5;
  (iii) LbZAT3 gene, with the nucleotide sequence of SEQ ID NO:3, or a nucleic acid sequence encoding the amino acid sequence of SEQ ID NO:6;
(c) under appropriate conditions, culturing the transformed host cells of (b) to catalyze the esterification of plant free carotenoids.

The second aspect of the present disclosure is to provide a transgenic plant or a renewable part thereof or a calli thereof, wherein the genome of the transgenic plants contains a trans-gene of encoding the carotenoid esterase protein, which is:
(i) LbZAT1 gene, with the nucleotide sequence of SEQ ID NO:1, or a nucleic acid sequence encoding the amino acid sequence of SEQ ID NO:4;
(ii) LbZAT2 gene, with the nucleotide sequence of SEQ ID NO:2, or a nucleic acid sequence encoding the amino acid sequence of SEQ ID NO:5;
(iii) LbZAT3 gene, with the nucleotide sequence of SEQ ID NO:3, or a nucleic acid sequence encoding the amino acid sequence of SEQ ID NO:6;

The third aspect of the present disclosure is to provide a biological agent that catalyzes the esterification of plant free carotenoids. The active components of the biological agent include:

(i) a carotenoid esterase protein and its encoding gene, or
(ii) an overexpression vector inserted with a carotenoid esterase encoding gene, or a transient expression vector inserted with a carotenoid esterase encoding gene, or
(iii) cells transformed with a carotenoid esterase encoding gene, wherein, the gene encoding carotenoid esterase comprises: LbZAT1 gene, LbZAT2 gene, and/or LbZAT3 gene; wherein, the nucleotide sequence of the LbZAT1 gene is shown in SEQ ID NO:1, or a nucleic acid sequence encoding the amino acid sequence of SEQ ID NO:4; the nucleotide sequence of the LbZAT2 gene is shown in SEQ ID NO:2, or a nucleic acid sequence encoding the amino acid sequence of SEQ ID NO:5; the nucleotide sequence of the LbZAT3 gene is shown in SEQ ID NO:3, or a nucleic acid sequence encoding the amino acid sequence of SEQ ID NO:6.

The inventor of the present disclosure finds that the content of zeaxanthin dipalmitate is significantly increased in tobacco that transiently expresses the encoding genes LbZAT1, LbZAT2, and LbZAT3 of carotenoid esterase; and in the transgenic *L. barbarum* calli overexpressing LbZAT1, LbZAT2 and LbZAT3 genes encoding carotenoid esterase, the carotenoid metabolism spectrum has more characteristic absorption peaks of esterified carotenoids at the peak position of esterified carotenoids than that of the control group, which proves that the proteins encoded by LbZAT1, LbZAT2 and LbZAT3 genes can catalyze the esterification of carotenoids containing free hydroxyl with fatty acid acyl donors. The carotenoid esterase and its encoding genes of the present disclosure have important application value in in vitro biosynthesis of esterified carotenoids.

DETAILED DESCRIPTION OF EMBODIMENTS

Figure 1:
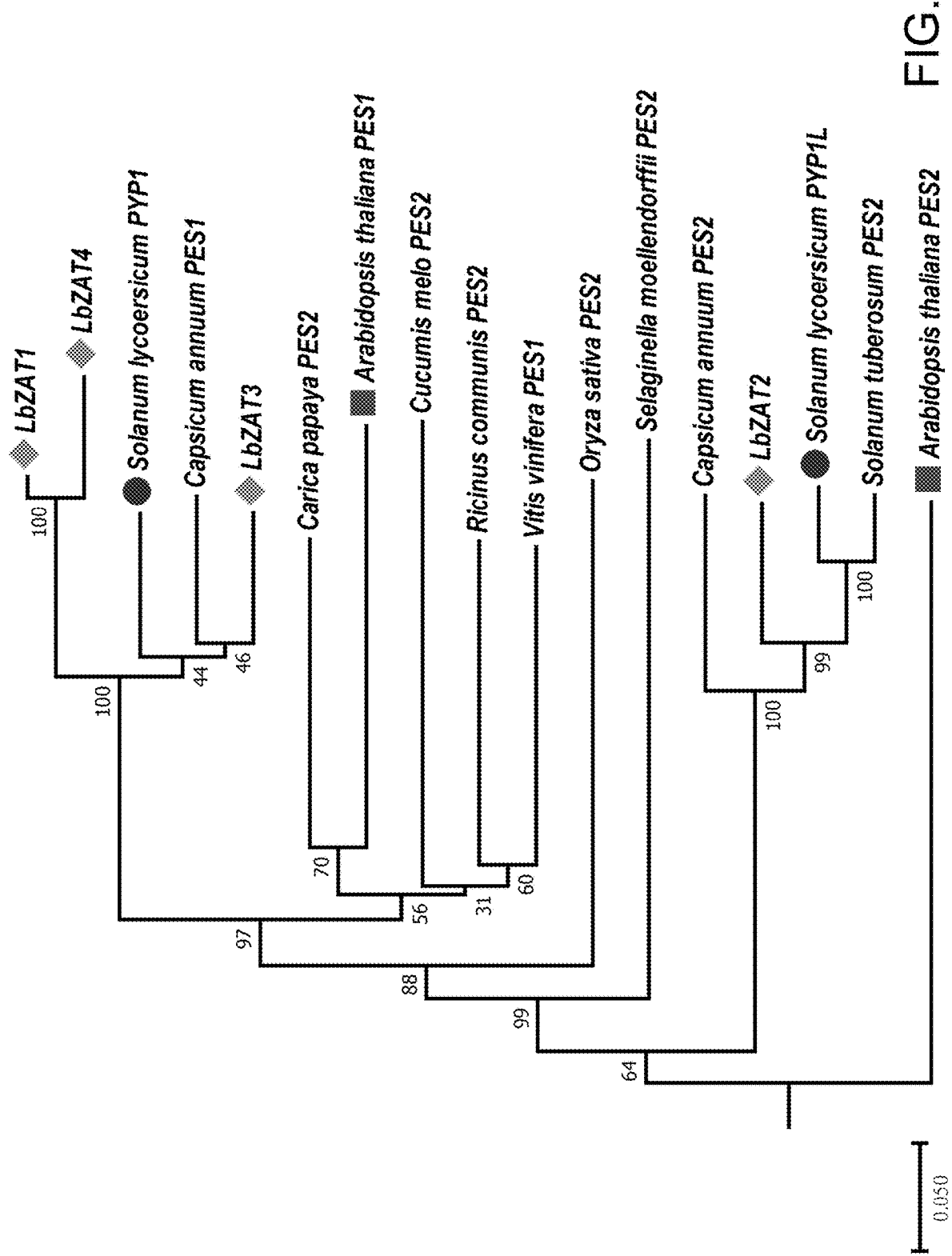
FIG. 1 shows the phylogenetic tree constructed by the carotenoid esterase protein sequences. Among them, LbZAT1, LbZAT2 and LbZAT3 were presented in Embodiments 1 in this disclosure.

In order to facilitate the understanding of the present disclosure, a more comprehensive description about the present disclosure is given below. The present disclosure can be implemented in many different forms, and it is not limited to the embodiments described herein. On the contrary, the purpose of providing these embodiments is to make the understanding of the disclosure more thorough and comprehensive.

Unless otherwise defined, all technical and scientific terms used herein have the same meanings as those commonly understood by those skilled in the art of the present disclosure. The terms used in the description of the present disclosure are for description of specific embodiments only and not intended to limit the present disclosure. The term "and/or" used in the present disclosure includes any and all combinations of one or more related listed items.

The following embodiments, if there are no special instructions, are usually performed in accordance with conventional conditions, such as those described in Molecular Cloning: A Laboratory Manual (M. R. Green and J. Sambrook, 2012), or those as recommended by the manufacturers.

In some embodiments, the present disclosure relates to genes encoding carotenoid esterase, which include: LbZAT1 gene, LbZAT2 gene, and/or LbZAT3 gene; wherein, the nucleotide sequence of the LbZAT1 gene is shown in SEQ ID NO:1, or a nucleic acid sequence encoding the amino acid sequence of SEQ ID NO:4; the nucleotide sequence of the LbZAT2 gene is shown in SEQ ID NO:2, or a nucleic acid sequence encoding the amino acid sequence of SEQ ID NO:5; The nucleotide sequence of the LbZAT3 gene is shown in SEQ ID NO:3, or a nucleic acid sequence encoding the amino acid sequence of SEQ ID NO:6.

```
                                                              SEQ ID NO: 1
ATGGTTTCTCTTCCGCAAAATTTCTGGGCAGCCCCTCATTTTGCTCGTCACCCAGGCTATAAGCCTCAGTGTATATCT

CGAATCACATGCTTAGCTAGCAGGGACTCCACATTTTTGCCTTCAGATTCTGTTAAAGTTAATGGTGTGTCCTCTATT

GAGGAAAAGGAGAAAAGTATCCCTGTAGTTGATGTGCAAAATGATCATTTGGATAAGAGCAAGGAGGACATGCGAAAC

AAGTTGGAACCCCTTTGGGATGATGGATATGGAACTCAAACTGTTAAGGATTATCTTGAGATAGGATTGGAGATTATT

AAGCCCGATGGAGGTCCTCCGCGGTGGTTTACTCCCATATCAGCTGGTCCTCCTTTGCAAGAATCTCCTCTCCTACTT

TTTCTGCCTGGAACGGATGGCACTGGCATGGGTCTTGTTTTGCATGAAAAGGCTCTTGGGAAAGTTTTTCAGGTTTGG

TGCTTGCATATTCCTGTGTATGATCGAACACCGTTTGACGAACTGGTGAATTTTGTCGAGAGAACTGTGAGGCTGAAG

CACGCTTCATCTCCAAACAAGCCAATTTATTTAGTTGGAGATTCATTTGGAGGGTGCTTGGCTCTTGCTGTTGCTGCT

CATAACCCTAAGATTGACCTTGTTCTGATATTAGTTAATCCAGCAACTTCCTTTGGGAAGTCACAGCTCCAACCTCTG

CTTCCTCTTCTAGAGTCTTTGCCTGATGAAATTCATGTTATGGTCCCTTATCTTATGAGCTTTATTATGGGTGATCCA

ATGAAGATGGCGATGGTTAACATTGATTCCATGCTTCCTCCTGGACAAATTATTCGACGTCTCTCTGACAACCTCACT
```

-continued

AGTTTGCTGGCCTACCTCCCTGGCTTAGCTGATATCATACCGAAGGAAACTCTTCTCTGGAAGTTGAAGCTTCTTAGA

TCTGCTTCATCTTATTCAAATTCCCGCCTCCATGCTGTTAACGCTGAAGTACTTGTGATTGCTAGTGGCAAGGATAAC

ATGTTTCCAAGTGGAGATGAAGCTCAGAGGCTTGCAAATTCATTAAGAAACTGCAAAGTACAATACTTCAAAGACAAT

GCGCATACTATTTTATTGGAAGATGGTATTAATCTGCTATCCATCATCAAAGGTACTAGCAAATATCGTCGTAAAAAA

AGGCATGATCCTGTCATGGATTTTCTTCTTCCTACTATGTCAGAGTTCAAGAACACAATCCAGGACTATAGTTGGTAT

CTCAATTTTACTGGTCCTGTTATGCTGTCCACACTGGAAAATGGGAAATTGTAAGAGGTCTAGCAGGGGTCCCACGT

GAAGGCCCTGTATTGTTGGTCGGTTATCACATGCTTATGGGTTTAGATTCTATCCCTCTCGTTCTAGAATGTTTGAGG

CAGAGGAAAATTTTACTTCGTGGTATAGCACATCCGGTATTGTTTACTCAGCGGACCGAGAGTCGAACTAATGAAAGC

TCATTCAATGATCTGTTGAGACTATCTGGATTTATGCCTGTCAGTGCCAGCAACCTTTTTAAGTTGCTTGCAACAAAG

TCACACATTCTGCTGTATCCTGGTGGTGCCCGTGAGGCCTTACATCGTAAGGGAGAAGAGTACAAGGTGATTTGGCCT

GACCAACCAGAATTCATCAGAATGGCAGCAAAATTTGGTGCGACAATTGTGCCGTTTGGGGTTGTAGGGAAGATGAT

ATAGCACAGTTAGTTCTCGACTATGACGACCTAAAAAATATTCCTATATTGGGTGATGGGATAAGGTATTATAACGAA

CATGCAGCGAGGAGTGGTTTAACAGTCAGGACGGACATGGACGAGGAGGTCGCCAACCAAGCACTGTATCTCCCGGGT

GTTTTACCTAAGATACCGGGTCGTTTTTACTACTTGTTTGGAAAACCTATTCACACAAAGGGAAGGAAGGACCTGGTG

AAAGACAGAGAGAAAGCAAGAGAATTGTACTTGCAGGTAAAATCTGAAGTTCAAAATAACATGAATTATTTGCTTAAG

AAAAGAGGAGGATCCTTACCGAAGCGTCATTGATCGGACCGTGCATAAAGCATTTTCTGCAACGTTTGATGATGTC

CCAACATTTGATTATTAA

SEQ ID NO: 2
ATGGCTGCTGGCGCTTACACGGCGGCCGGTGTTTCGCCGCTGCTCCAATATCGGAACTCATCATGCCTCCACGTCAGA

TTCAATTATTTGGTGCGTGCATCACAACCGCCAGCACAGATGACGCCTGCTCTGTCGAGCAACAAGGGAAGCAGCAAC

TCCATAACCGAGAAAACAAGTTTGATTATGAAAGATTACATGGAATGGAGCAAGGATATGATTGGCTCCGGTGGGCCA

CCACGCTGGTTTTCCCCCTTGGAGTGCGGTCCACCTATCAAAGACTCCCCTCTCTTGCTCTATTTACCAGGGATTGAT

GGTATTGGACTTGGCCTTATAAAGCATCACAGAAGACTTGGAAGGATCTTCAATATATGGTGTCTCCATGTTCCAGTT

ACAGATCGAACATCGTTCTCAGACCTGGTGCACCTGGTTGAAGCAACTGTTAGGTCAGAGAATCACCATGCACCAAGA

CGTCCCATCTATCTTCTTGGAGAATCTTTTGGCGGATGTCTAGCACTTGCTGTTGCTGCTCGTAATCCACATATTGAT

CTTGCTCTAATTTTGTCAAACCCAGCCACACGTTTACGGGAGTCTCAGCTGCAAAATCTGATAACGTTGTCAGAAGTC

ATTCCTGAGCAACTTCATCCAAGCATGGTTAAAATGCTAAGTGTGACTACAGGTGTTCCTGCAAGGGTGGCAGTGGCA

ATTCCTGGCAGCGTACACCCTTTGCAACAAGCAGCAGCAGAGTTATTTCGTGGTGATGTAGCATTTTCATCCTACTTA

TCTGTGCTGGCTGATGTGTTACCTGTAGGAACACTTATCTGGCGGCTGAAGATGCTCAAAGCAGCCGCAGCTTTTGTC

AGTTCCCGCCTCCATGCTGTCAAAGCACAAACTCTGGTACTTTCGAGCGGAAAGGATCACTTGATACCCAGCCTTGAG

GAATCTGAGAAGCTTCATCAGATGCTTCCAAACTGTGAGATCCGGAGATTTAATAACAGTGGTCATGTCCTTCTCCTG

GAAGCAGACTTTAATTTGGTAACTGTCATGACGGGCGCCAATTTTTATCGACGTGGAAGACACCTTGACTTCGTCACA

GATTTTGTGCCGCCAAGCACTTCTGAGTTTGACAACGTGTATAAACCGTACAGGTGGATGGAAGTTGCCTTCAACCCT

GTGATGATATCAACTCTCGAAAATGGGAATGTTGTTCGGGGTCTGACTGGAATTCCTACTGAAGGCCCAGTCTTACTT

GTTGGTTATCACATGATGCTTGGACTTGAACTAGTTCCTTTGGTGTCCCGTTTGTGGAATGAACATAAGATTGTCCTA

CGAGGCATAGCACATCCATTGATGTTAAGAGAGCAAGAGTGGGAAATATGCCTGCGTTATCAATGTATGATGATTAC

CGATTTATGGGTGCAGTTCCCGTGTCGGCAACTAACTTCTATAAACTTTTATCATCAAAATCCCACATGTTGCTGTAT

CCCGGGGGCATGCGGGAAGCTCTTCACCGGAAGGGGAGGAGTACAAATTGTTCTGGCCAGAACAGTCTGAATTTGTC

AGAATGGCAGCTAGATTGGAGCTAAAATTATACCTTTTGGTTCAGTGGGAGAAGATGATATTGGCCAGATGCTCCTT

GATTACGATGACCTGATGAAGATTCCCTATTTCAAGGCTGGCATAGAGGAGTTAACTGGTCAAGTGGAGAAGCTAAGA

AATGACACTGAAGGAGAGGTTTCAAACCAAGATGTACATCTTCCAATCATTCTTCCAAAAGTTCCTGGTCGTTTTTAC

-continued

```
TTCTACTTCGGCAAGCCAATTGAAACAGAAGGGAGGAAGGAGGAACTAAAAAGCAGGGAGAAAGCACATGAATTATAC

TTGGAAGTGAAGTCTGAGGTTGAGAGATGCATTGGTTACCTGAAGGAGAAAAGAGAAAAAGATCCGTATAGGAGCATC

ATGGCCCGCCTCCCTTACCAGGCTAGCCATGGCTTTGATTCTGAAGTTCCCACATTTGACCTATAG
```

SEQ ID NO: 3
```
ATGGCTTCTCTTCTGCAAAATTTCTGGGCAGCCCCTCGTTTTGCTTTTAGCCCAGACTATAAGCCTCAGTGTATAGCT

CGAACCACGTGCTTAGCTAGCAGGGATTCCACATTATTGTCTTCAGATTCTGTTAACGGTGTGCCCTCTATTCAGGAA

AAGGAGAAAAGTAGCCCAATAGCTGATGTGGAAAACGGTCGTCTGGCTTCACCTATTAAGGAGAAGAGCAAGGAGGAT

ATTCAAAACAAGTTGGAACCCCTTTGGGATGATGGATATGGAACTCAAACTGTTAAGGATTACCTTGAGATAGGATCG

GAGATTATAAAGCCCGATGGAGGTCCTCCGCGGTGGTTTACTCCCATATCAGCTGGCCCTCCTTTGGAAGACTCTCCT

CTCCTCCTTTTCTGCCTGGAATGGATGGTACTGGAATGGGTCTTGTTTTGCATGAGAAGGCTCTTGGGAAAGTTTTT

CAGGTTTGGTGCTTGCATATTCCTGTGTATGATCGAACACCGTTTGACGAACTGGTGAAATTTGTCGAGAGAACTGTG

AGGTTGAAGCATGCTTCATCTCCAAACAAGCCAATTTATTTAGTTGGAGATTCACTTGGAGGGTGCTTGGCTCTTGCT

GTTGCTGCTCATAATCCTAAGATTGACCTTGTTCTGATATTAGCTAATCCAGCTACTTCATTTGGCAGGACACAACTC

CAACCTCTGCTTCCTCTTCTAGAGTCTTTGCCTGATGAAATTCATGTTACGGTCCCATATCTACTGAGCTTTGTTATG

GGTGATCCAATGAAGATGGCGATGGTTAACATTGATTCCATGCTTCCTCCTGGACAAATTATTCAACGTCTCTCTGAC

AACCTCACTGGTTTGCTGGCACACCTCTCTGGCTTAGCTGATATCATACCGAAGGAAACTCTTCTCTGGAAGTTGAAG

CTTCTTAGATCTGCTTCATCTTATTCAAATTCCCGCCTCCATGCTGTTAATGCTGAAGTACTTGTGATTGCTAGTGGC

AAGGATAACATGCTTCCAAGTGGAGATGAAGCTCAGAGGCTTGCAAATTCATTAAGAAACTGCAAAGTACGATACTTC

AAAGACAATGGGCATACTATTTTATTGGAAGATGGTATTAATCTGCTAACCATCATCAAAAGTACTAGCAAATATCGT

CGTTCGAAAAGGCACGATTATGTCATGGATTTTCTGCCTCCTAGTGAGTCAGAATTCAAGAACGCACTCAAGGACAAT

AGATGGTATCTCAATTTTACTAGTCCAGTTATGCTGTCCACAATGGAAAATGGGAAAATTGTAAGAGGTCTAGCAGGG

GTCCCATGTGAAGGCCCTGTGTTGTTGGTCGGTTATCACATGCTTATGGGATTAGAAATTACCCCTCTTGTTTCAGAA

TATTTGAGGCAGAGGAAAATTTTACTTCGTGGTATAGCACATCCGACATTGTTTACTCAGATGACTGAGAGTCAAACT

AATGAAAGCTCATTCACTGATGTGCTGAGACTATATGGAGCTACGCCTGTCAGTGCCAGCAACTTCTTTAAGTTGCTT

GCAACAAAGTCACATGTTCTGCTGTATCCTGGTGGTGCCCGTGAGGCCTTACATCGTAAGGGAGAAGAGTACAAGGCG

ATTTGGCCTGATCAACCAGAATTCATCAGAATGGCTGCAAGGTTTGGTGCGACAATTGTGCCATTTGGGGTTGTAGGG

GAAGATGATATAGCACAGTTAGTTCTCGACTATGACGACCTAAAAAATATTCCTATAGTGGGTGATCGGATAAGGCGT

GATAACGAACAGGCAGCCAGGAGGGGTTTAGCAGTCAGGGCGGACATGGACGGGGAGGTTGCCAACCAAGCGCTGTAT

CTCCCGGGCCTTTTACCTAAGATACCCGGTCGTTTTTACTACTTGTTTGGAAAACCTATTCATACGAAGGGAAGGAAG

GACCTGGTGAAAGACAGAGAGAAAGCAAGAGAATTGTACTTGCGGGTAAAATCTGAAGTTCAAAATAACATGAATTAT

TTGCTTAAGAAAAGAGAGGAGGATCCTTACCGAAGCGTCATTGATCGGACCGTGCATAAAGCATTTTCTGCAACGTTT

AATGATGTCCCAACATTTGATTATTAG
```

In some embodiments, the present disclosure provides carotenoid esterases, which include: LbZAT1 protein with the amino acid sequence as shown in SEQ ID NO:4, LbZAT2 protein with the amino acid sequence as shown in SEQ ID NO:5, and/or LbZAT3 protein with the amino acid sequence as shown in SEQ ID NO:6.

SEQ ID NO: 4
```
MVSLPQNFWAAPHFARHPGYKPQCISRITCLASRDSTFLPSDSVKVNGV

SSIEEKEKSIPVVDVQNDHLDKSKEDMRNKLEPLWDDGYGTQTVKDYLE

IGLEIIKPDGGPPRWFTPISAGPPLQESPLLLFLPGTDGTGMGLVLHEK
```

-continued
```
ALGKVFQVWCLHIPVYDRTPFDELVNFVERTVRLKHASSPNKPIYLVGD

SFGGCLALAVAAHNPKIDLVLILVNPATSFGKSQLQPLLPLLESLPDEI

HVMVPYLMSFIMGDPMKMAMVNIDSMLPPGQUIRRLSDNLTSLLAYLPG

LADIIPKETLLWKLKLLRSASSYSNSRLHAVNAEVLVIASGKDNMFPSG

DEAQRLANSLRNCKVQYFKDNAHTILLEDGINLLSIIKGTSKYRRKKRH

DPVMDFLLPTMSEFKNTIQDYSWYLNFTGPVMLSTLENGKIVRGLAGVP

REGPVLLVGYHMLMGLDSIPLVLECLRQRKILLRGIAHPVLFTQRTESR
```

-continued

TNESSFNDLLRLSGFMPVSASNLFKLLATKSHILLYPGGAREALHRKGE

EYKVIWPDQPEFIRMAAKFGATIVPFGVVGEDDIAQLVLDYDDLKNIPI

LGDGIRYYNEHAARSGLTVRTDMDEEVANQALYLPGVLPKIPGRFYYLF

GKPIHTKGRKDLVKDREKARELYLQVKSEVQNNMNYLLKKREEDPYRSV

IDRTVHKAFSATFDDVPTFDY

SEQ ID NO: 5

MAAGAYTAAGVSPLLQYRNSSCLHVRFNYLVRASQPPAQMTPALSSNKG

SSNSITEKTSLIMKDYMEWSKDMIGSGGPPRWFSPLECGPPIKDSPLLL

YLPGIDGIGLGLIKHHRRLGRIFNIWCLHVPVTDRTSFSDLVHLVEATV

RSENHHAPRRPIYLLGESFGGCLALAVAARNPHIDLALILSNPATRLRE

SQLQNLITLSEVIPEQLHPSMVKMLSVTTGVPARVAVAIPGSVHPLQQA

AAELFRGDVAFSSYLSVLADVLPVGTLIWRLKMLKAAAAFVSSRLHAVK

AQTLVLSSGKDHLIPSLEESEKLHQMLPNCEIRRFNNSGHVLLLEADFN

LVTVMTGANFYRRGRHLDFVTDFVPPSTSEFDNVYKPYRWMEVAFNPVM

ISTLENGNVVRGLTGIPTEGPVLLVGYHMMLGLELVPLVSRLWNEHKIV

LRGIAHPLMFKRARVGNMPALSMYDDYRFMGAVPVSATNFYKLLSSKSH

MLLYPGGMREALHRKGEEYKLFWPEQSEFVRMAARFGAKIIPFGSVGED

DIGQMLLDYDDLMKIPYFKAGIEELTGQVEKLRNDTEGEVSNQDVHLPI

ILPKVPGRFYFYFGKPIETEGRKEELKSREKAHELYLEVKSEVERCIGY

LKEKREKDPYRSIMARLPYQASHGFDSEVPTFDL

SEQ ID NO: 6

MASLLQNFWAAPRFAFSPDYKPQCIARTTCLASRDSTLLSSDSVNGVPS

IQEKEKSSPIADVENGRLASPIKEKSKEDIQNKLEPLWDDGYGTQTVKD

YLEIGSEIIKPDGGPPRWFTPISAGPPLEDSPLLLFLPGMDTGMGLVL

HEKALGKVFQVWCLHIPVYDRTPFDELVKFVERTVRLKHASSPNKPIYL

VGDSLGGCLALAVAAHNPKIDLVLILANPATSFGRTQLQPLLPLLESLP

DEIHVTVPYLLSFVMGDPMKMAMVNIDSMLPPGQIIQRLSDNLTGLLAH

LSGLADIIPKETLLWKLKLLRSASSYSNSRLHAVNAEVLVIASGKDNML

PSGDEAQRLANSLRNCKVRYFKDNGHTILLEDGINLLTIIKSTSKYRRS

KRHDYVMDFLPPSESEFKNALKDNRWYLNFTSPVMLSTMENGKIVRGLA

GVPCEGPVLLVGYHMLMGLEITPLVSEYLRQRKILLRGIAHPTLFTQMT

ESQTNESSFTDVLRLYGATPVSASNFFKLLATKSHVLLYPGGAREALHR

KGEEYKAIWPDQPEFIRMAARFGATIVPFGVVGEDDIAQLVLDYDDLKN

IPIVGDRIRRDNEQAARRGLAVRADMDGEVANQALYLPGLLPKIPGRFY

YLFGKPIHTKGRKDLVKDREKARELYLRVKSEVQNNMNYLLKKREEDPY

RSVIDRTVHKAFSATFNDVPTFDY

In another embodiment, the present disclosure also provides an overexpression vector inserted with a carotenoid esterase encoding gene, a transformation cell transformed with the above-mentioned carotenoid esterase encoding gene, and/or a transgenic calli containing the above-mentioned carotenoid esterase encoding gene.

The overexpression vector is obtained by effectively inserting the above-mentioned encoding gene of carotenoid esterase into an expression vector, wherein the expression vector includes but is not limited to viral vector (including adenovirus vector, retrovirus vector or adeno-associated virus vector), plasmid, phage, phagemid, fosmid, F-fosmid, phage or artificial chromosome (including bacterial artificial chromosome BAC, PAC vector derived from bacteriophage P1, yeast artificial chromosome YAC or mammalian artificial chromosome MAC); preferably, the expression vector is a plasmid; and more preferably, the plasmid is pET32a and/or pGWB5.

The transformed cells include bacterial cells, fungal cells (including yeast) or plant cells; wherein the bacterial cells include *Escherichia, Agrobacterium, Bacillus, Streptomyces, Pseudomonas* or *Staphylococcus*. Preferably, the bacterial cells include but is not limited to *Escherichia coli* (such as BL21 (DE3)), *Agrobacterium tumefaciens* (such as GV3101), *Agrobacterium rhizogenes, Lactococcus lactis, Bacillus subtilis, Bacillus cereus* or *Pseudomonas fluorescens*.

In some embodiments, the above-mentioned overexpression vector inserted with a gene encoding carotenoid esterase, or a transient expression vector inserted with a gene encoding carotenoid esterase, or a cell transformed with a gene encoding carotenoid esterase can be used as an organism that catalyzes the esterification of plant free carotenoids.

In some embodiments, a biological agent is also provided, which has active components including the gene encoding carotenoid esterase, or an overexpression vector inserted with the gene encoding carotenoid esterase, or a transient expression vector inserted with the gene encoding carotenoid esterase, or a transformed cell transformed with the gene encoding carotenoid esterase.

Wherein the genes encoding carotenoid esterase includes: LbZAT1 gene, LbZAT2 gene, and/or LbZAT3 gene; wherein, the nucleotide sequence of the LbZAT1 gene is shown in SEQ ID NO: 1, or the amino acid sequence of the protein encoded by the LbZAT1 gene is shown in SEQ ID NO: 4; the nucleotide sequence of the LbZAT2 gene is shown in SEQ ID NO:2, or the amino acid sequence of the protein encoded by the LbZAT2 gene is shown in SEQ ID NO:5; the nucleotide sequence of the LbZAT3 gene is shown in SEQ ID NO:3, or the amino acid sequence of the protein encoded by the LbZAT3 gene is shown in SEQ ID NO:6.

In some embodiments, the present disclosure relates to a method for catalyzing the esterification of plant free carotenoids, which comprises the following steps:
(a) preparing plant host cells;
(b) transforming the nucleic acid molecule encoding the carotenoid esterase into the host cells of (a), wherein the nucleic acid molecule is selected from:
  (i) LbZAT1 gene, whose nucleotide sequence is shown in SEQ ID NO:1, or the amino acid sequence of the protein encoded by the LbZAT1 gene is shown in SEQ ID NO:4;
  (ii) LbZAT2 gene, whose nucleotide sequence is shown in SEQ ID NO:2, or the amino acid sequence of the protein encoded by the LbZAT2 gene is shown in SEQ ID NO:5;
  (iii) LbZAT3 gene, whose nucleotide sequence is shown in SEQ ID NO:3, or the amino acid sequence of the protein encoded by the LbZAT3 gene is shown in SEQ ID NO:6;
(c) under appropriate conditions, culturing the transformed host cells of (b) to catalyze the esterification of plant free carotenoids.

The nucleic acid molecule of the encoding gene can be derived from the above-mentioned over expression vector, or the transient expression vector, or the transformed cell.

In some embodiments, the present disclosure relates to a transgenic plant or its renewable part or its calli. The genome of the transgenic plant contains the trans-gene encoding the carotenoid esterase protein, which is:
 (i) LbZAT1 gene, whose nucleotide sequence is shown in SEQ ID NO:1, or the amino acid sequence of the protein encoded by the LbZAT1 gene is shown in SEQ ID NO:4;
 (ii) LbZAT2 gene, whose nucleotide sequence is shown in SEQ ID NO:2, or the amino acid sequence of the protein encoded by the LbZAT2 gene is shown in SEQ ID NO:5;
 (iii) LbZAT3 gene, whose nucleotide sequence is shown in SEQ ID NO:3, or the amino acid sequence of the protein encoded by the LbZAT3 gene is shown in SEQ ID NO:6.

In some embodiments, the plant includes, but is not limited to medlar, *Arabidopsis*, corn, sorghum, potato, tomato, wheat, rape, soybean, rice, barley or tobacco.

The following are specific Embodiments to further describe the present disclosure in detail.

Embodiments 1 Screening and Structural Analysis of Carotenoid Esterase from *L. barbarum*

1. Screening of Carotenoid Esterase from *L. barbarum*

Hidden Markov model (HMM) of lysophospholipid acyltransferases (LPLATs) protein superfamily was downloaded. The protein sequence of whole genome of *L. barbarum* was locally searched by hmmsearch. LbPLATs superfamily sequences were screened out according to E<0.01, and a total of 70 LPLATs superfamily sequences were obtained.

LPLATs sequences of some model species were downloaded, and homologous comparison with the above screened LbLPLATs superfamily sequences was performed to construct a phylogenetic tree as shown in FIG. 1. It can be seen that LbZAT1 and LbZAT4 sequences are highly homologous, and they are clustered together with LbZAT3. This branch also contains tomato PYP1 and pepper PES1 proteins, while LbZAT2 and tomato PYP1L are clustered into one branch.

2. Structural Analysis of Carotenoid Esterase from *L. barbarum*

Figure 2:
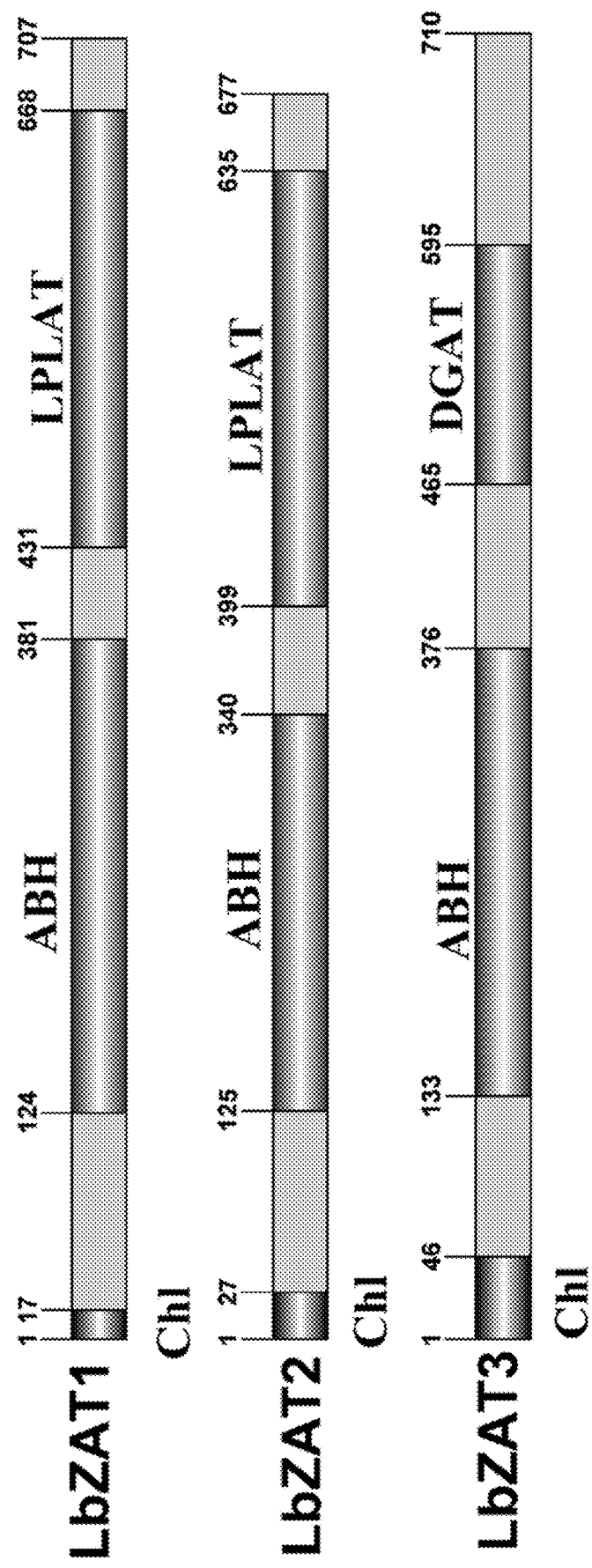
FIG. 2 shows the predicted results of protein structure of carotenoid esterase LbZAT1, LbZAT2 and LbZAT3 in Embodiments 1 of the present disclosure. Wherein Chl: plastid signal peptide; ABH: α/β hydrolase domain; LPLAT: lysophosphatidyl acyltransferase domain; DGAT: Diacylglycerol acyltransferase domain.

The structures of LbZAT1, LbZAT2 and LbZAT3 proteins were predicted by ProtComp 9.0, and the results are shown in FIG. 2.

The protein sequences of LbZAT1, LbZAT2 and LbZAT3 all have chloroplast signal peptides. The length of plastid (Chl) signal peptides on each protein sequence varies. The first 17 amino acids of LbZAT1, the first 27 amino acids of LbZAT2 and the first 46 amino acids of LbZAT3 are all predicted as plastid signal peptides.

In terms of conserved functional domain, both LbZAT1 and LbZAT2 have an α/β hydrolase (ABH) domain and a lysophosphatidic transferase superfamily (LPLAT) domain. The difference is that the α/β hydrolase domain LbZAT1 belongs to pimeloyl-ACP methyl ester carboxylesterase, while the hydrolase domain of LbZAT2 belongs to Serine aminopeptidase conserved domain (S33).

LbZAT3 has a of α/β hydrolase (ABH) domain and a diacylglycerol acyltransferase (DGAT) domain.

The three carotenoid esterase candidates are screened as follows:

1. A carotenoid esterase LbZAT1 protein, having the amino acid sequence shown in SEQ ID NO:4, whose encoding gene has the nucleotide sequence shown in SEQ ID NO:1.

2. A carotenoid esterase LbZAT2 protein, having the amino acid sequence shown in SEQ ID NO:5, whose encoding gene has the nucleotide sequence shown in SEQ ID NO:2.

3. A carotenoid esterase LbZAT3 protein, having the amino acid sequence shown in SEQ ID NO:6, whose encoding gene has the nucleotide sequence shown in SEQ ID NO:3.

Embodiments 2 Construction of Recombinant Vectors Overexpressing LbZAT1, LbZAT2 and LbZAT3 Genes, Respectively In this embodiment, recombinant vectors overexpressing LbZAT1, LbZAT2 and LbZAT3 genes were constructed, respectively, which specifically includes the following steps:

1. Extraction of RNA from *L. barbarum*.

Fruits of *L. barbarum* collected from Zhongning, Ningxia were quick-frozen with liquid nitrogen, ground into powder, and the total RNA of fruits was extracted with HiPure Plant RNA Mini Kit C (Magen). The concentration of RNA was determined as 250 ng/μL by NanoDrop. 4 μL of RNA for each system was added into a 200 μL RNAase free PCR tube to prepare a reaction mixture on ice according to the compositions in Table 1. Then the system was fully mixed and left at room temperature for 5 minutes.

TABLE 1

| Reaction mixture | |
| --- | --- |
| 5 × gDNA Eraser Buffer | 2.0 μL |
| gDNA Eraser | 1.0 μL |
| RNA sample | 1.0 μg |
| RNase Free ddH$_2$O | up to 10 μL |

2. cDNA was Synthesized by Using a PrimeScript RT Reagent Kit.

The reaction mixture in step 1 was put back on ice to prepare the reverse transcription system according to the compositions in Table 2. The reverse transcription system was fully mixed, centrifuged and placed in a PCR instrument for reverse transcription. The procedure was: 37° C., 15 minutes; 85° C., 5 sec; stored at 4° C. After reaction, 95 μL ddH$_2$O was added into each system for dilution, followed with fully mixing, and left on ice for standby.

TABLE 2

| Reverse Transcription System | |
| --- | --- |
| Mixture in step 1 | 10 μL |
| PrimerScript RT Enzyme Mix 1 | 1.0 μL |
| RT Primer Mix | 1.0 μL |
| 5 × PrimerScript Buffer 2 | 4.0 μL |
| RNase Free ddH$_2$O | up to 20 μL |

3. Primers Designed for Amplification of LbZAT1, LbZAT2 and LbZAT3 Genes are Shown in Table 3.

TABLE 3

Primer sequences for gene amplification

| Gene | Primer | Sequence |
|---|---|---|
| LbZAT1 | LbZAT1-F | GCGTCGACATGGTTTCTCTTCCGCA (SEQ ID NO: 7) |
|  | LbZAT1-R | GGGGTACCATAATCAAATGTTGGGACATC (SEQ ID NO: 8) |
| LbZAT2 | LbZAT2-F | GCGTCGACATGGCTGCTGGCGCT (SEQ ID NO: 9) |
|  | LbZAT2-R | GGGGTACCTAGGTCAAATGTGGGAACTTC (SEQ ID NO: 10) |
| LbZAT3 | LbZAT3-F | GCGTCGACATGGCTTCTCTTCTGC (SEQ ID NO: 11) |
|  | LbZAT3-R | GGGGTACCATAATCAAATGTTGGGACAT (SEQ ID NO: 12) |

4. PCR Amplification to Obtain LbZAT1, LbZAT2 and LbZAT3 Genes Respectively

PrimeSTAR Max (Takara) premixed reaction solution was used for PCR amplification to obtain LbZAT1, LbZAT2 and LbZAT3 genes respectively with cDNA (diluted to about 100 ng/μL) from the fruits of L. barbarum in step 2 as a template, and the forward and reverse primer pairs shown in Table 3 were used as primers. The PCR reaction system is shown in Table 4.

TABLE 4

PCR Reaction System

| PrimeSTAR Max(2×) | 25 μL |
| cDNA | 3 μL |
| Primer F(10 μM) | 1 μL |
| Primer R(10 μM) | 1 μL |
| ddH$_2$O | Up to 50 μL |

PCR reaction conditions: 98° C. for 2 min, 35 cycles: denaturation at 98° C. for 30 s, annealing at 58° C. for 1 min, extending at 72° C. for 1 min; Ultimate extension at 72° C. for 10 min.

5. Construction of Recombinant Vectors Overexpressing LbZAT1, LbZAT2, LbZAT3 Genes The target fragment obtained in step 4 and the overexpression binary vector pSuper GFP (Shi et al., 2012) were digested by double digestion of Sal I and Kpn I respectively. After purification, they were linked by T4 ligase for 4 hours. The connection product was transformed into competent DH5a. The next day, monoclonal clones were selected from Kan resistant plates for Colony PCR identification. The monoclonal clones which have a band with the size meeting the expectation were sent for sequencing. Thereof, recombinant vectors for overexpressing LbZAT1, LbZAT2, LbZAT3 genes were constructed and named pSuper-LbZAT1-GFP plasmid, pSuper-LbZAT2-GFP plasmid and pSuper-LbZAT3-GFP plasmid, respectively.

Embodiments 3 Content Changes of Zeaxanthin and Zeaxanthin Dipalmitate in Tobacco Leaves Transient Expressing LbZAT1, LbZAT2 and LbZAT3 Genes 1 μg of pSuper-LbZAT1-GFP plasmid, pSuper-LbZAT2-GFP plasmid and pSuper-LbZAT3-GFP plasmid prepared in Embodiments 2 were added into 50 μL of competent cells of GV3101 respectively; left on ice for 5 min froze in liquid nitrogen for 5 min, and bathed in water at 37° C. for 5 min; and then left back on ice; 400 μL of LB medium was added and the cells were resuscitated in a 28° C. incubator for 2 h, 200 μL of culture was taken out and coated on LB (25 mg/L Rif+50 mg/L Kan) solid medium and incubated at 28° C. for 48 h.

Several positive clones on the solid medium were selected and propagated overnight in 2 mL of liquid LB (25 mg/L Rif+50 mg/L Kan) medium to obtain seed culture. The next day, the system was expanded to 10 mL, cultured for 8 h, then centrifuged at 4000 rpm for 10 min, the supernatant was discarded. The Agrobacterium carrying pSuper-LbZAT1-GFP plasmid, pSuper-LbZAT2-GFP plasmid and pSuper-LbZAT3-GFP plasmid were resuspended with injection buffer (1 mM MgCl$_2$, 1 mM MES at pH 5.8 and 1 mM acetyleugenone), adjusting the OD$_{600\,nm}$ to 0.6.

Figure 3:
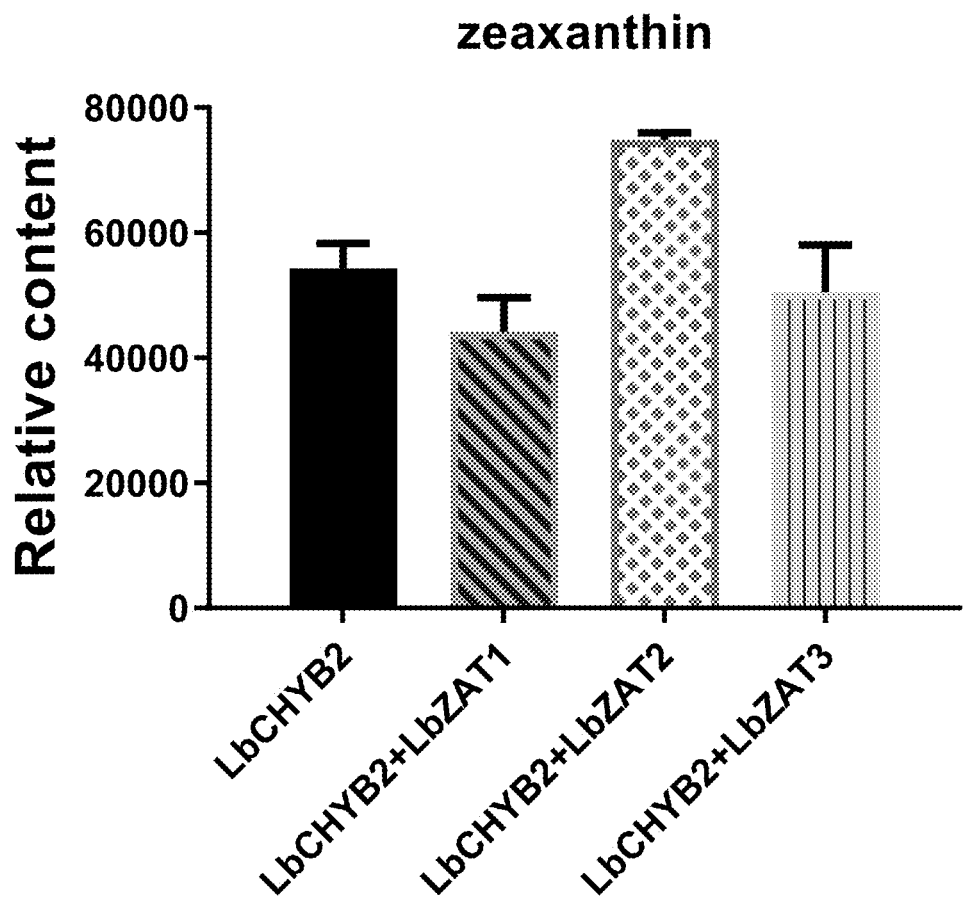
FIG. 3 shows the relative content of zeaxanthin in tobacco leaves that transiently expressed carotenoid esterase encoding genes LbZAT1, LbZAT2 or LbZAT3 in Embodiments 3 of the present disclosure.
Figure 4:
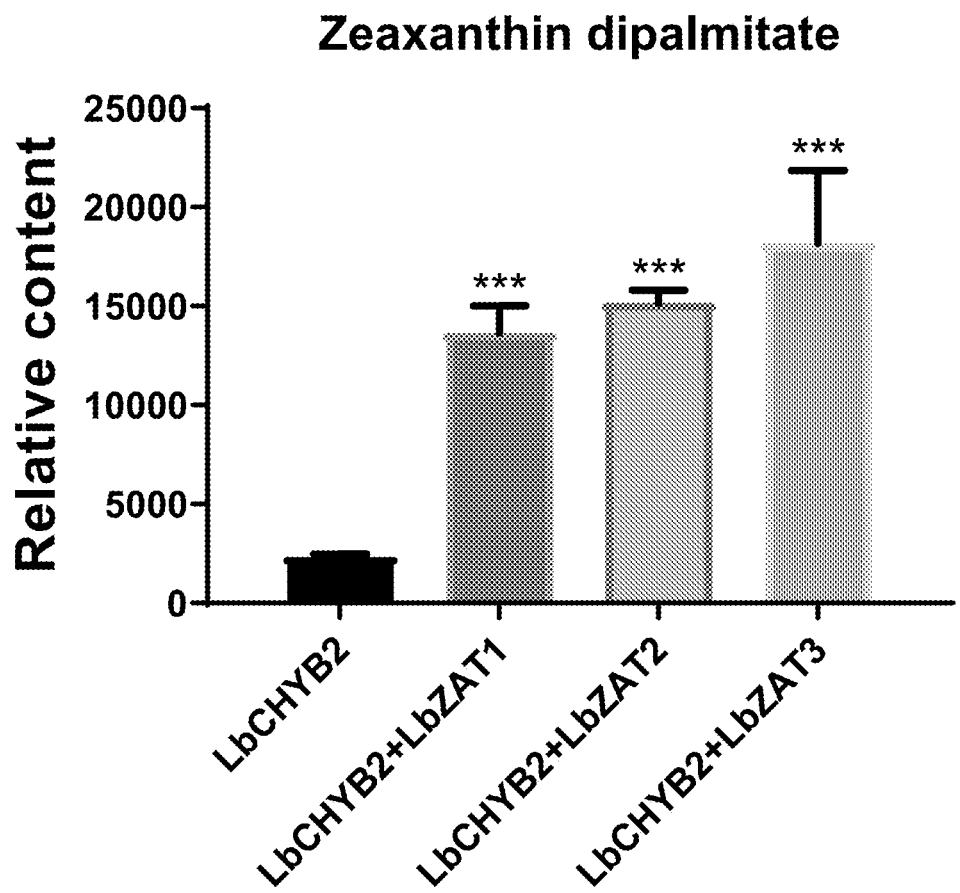
FIG. 4 shows the relative content of zeaxanthin dipalmitate (***: $P<0.001$) in tobacco leaves that transiently expressed carotenoid esterase encoding genes LbZAT1, LbZAT2 or LbZAT3 in Embodiments 3 of the present disclosure.

LbCHYB2 gene amplified from L. barbarum was used to construct pSuper-LbCHYB2-mCherry overexpression plasmid according to the method of Embodiments 2, and transformed into Agrobacterium EHA105 according to the method of this Embodiments. The Agrobacterium carrying pSuper-LbCHYB2-mCherry plasmid was resuspended with injection buffer (1 mM MgCl$_2$, 1 mM MES at pH 5.8 and 1 mM acetyleugenone), and adjusting the OD$_{600\,nm}$ to 0.6. The Agrobacterium carrying LbCHYB2 overexpression plasmid were mixed with the Agrobacterium carrying pSuper-LbZAT1-GFP plasmid, pSuper-LbZAT2-GFP plasmid and pSuper-LbZAT3-GFP plasmid respectively at a volume ratio of 1:1 and left for 3 h. The tobacco leaves in good growth conditions were selected to be injected with 1 mL of bacterial solution at the lower epidermis of the tobacco leaves. Then the tobaccos were cultured overnight in the dark under suitable humidity. The samples were collected after 48 hours. The contents of zeaxanthin and zeaxanthin dipalmitate in tobacco leaves were detected (Lin et al., 2021), and the results are shown in FIG. 3 and FIG. 4 respectively.

Since wild type tobacco leaves contain a certain amount of β-Carotene, overexpression of LbCHYB2 gene can promote the conversion of β-Carotene into zeaxanthin, and provides a substrate for esterification. It can be seen from FIG. 3 and FIG. 4 that when LbCHYB2 and LbZAT1, LbZAT2 and LbZAT3 genes are co-expressed in tobacco leaves, the content of zeaxanthin has no significant change compared with the single overexpression of LbCHYB2 gene, while the content of zeaxanthin dipalmitate has been significantly increased (P<0.001).

The results of Embodiments 3 proved that the proteins encoded by LbZAT1, LbZAT2 or LbZAT3 genes have function of catalyzing carotenoid esterification.

Embodiments 4 Extraction and Analysis of Carotenoids from Transgenic Calli of L. barbarum Carotenoids in L. barbarum L. transgenic calli overexpressing LbZAT1 and LbZAT2 genes were extracted and analyzed in this embodiment, which specifically includes the following steps:

1. Induction of Transgenic Calli of L. barbarum L.

The hypocotyl segments of L. barbarum L. were cut and inoculated in Agrobacterium EHA105 liquid culture with OD$_{600\,nm}$ about 0.2 (i.e. Agrobacterium carrying pSuper-LbZAT1-GFP plasmid/pSuper-LbZAT2-GFP plasmid) for 20 min (Agrobacterium EHA105 liquid culture carrying overexpression binary vector pSuper-GFP as a control).

Then the hypocotyl segments were taken out, dried on sterilized filter paper, then transferred to co-cultured medium (MS+0.5 mg/L NAA+0.5 mg/L 6-BA), and precultured for 3 days in the dark. Then the hypocotyl segments were transferred to the calli induction medium (MS+0.5 mg/L NAA+0.5 mg/L 6-BA+5 mg/L hygromycin (HgyB)+ 250 mg/L cefotaxime sodium (Cef)) and subcultured once every two weeks. The transgenic calli of L. barbarum overexpressing LbZAT1 and LbZAT2 genes were obtained respectively.

2. Extraction of Carotenoid

The transgenic calli of L. barbarum, which had been subcultured twice and overexpressed LbZAT1 gene, LbZAT2 gene, were put into 5 mL sample tubes added pre-cooled steel balls respectively, then the calli were ground into powder by a cryogenic cell grinder.

50 mg of powdered samples were added into a 15 mL glass centrifuge tube, added with 3 mL of mixed extraction solvent of N-Hexane/Acetone/Ethanol (volume ratio 2:1:1)+ 0.01% 2,6-di-tert-butyl-p-cresol (BHT), and then extracted by ultrasonic for 30 min; the mixture was centrifuged at 2500 rmp for 5 min, and the upper extract was drawn into a new centrifuge tube through a glass pipette. 3 mL of the above-mentioned mixed extraction solvent was added into the residue and repeated the extraction until the calli powder turned white (usually 2-3 times). The extracts were combined, added with 2 mL of saturated NaCl, fully mixed, and left for layering. The upper colored solution was transferred into a 5 mL brown sample bottle, and spun with a vacuum concentrator to obtain the dry sample. The sample was redissolved in 800 μL of HPLC grade dichloromethane, filtered with PTFE filter membrane, and dropped into a 2 mL HPLC sample bottle for HPLC analysis.

3. Metabolism Analysis of Carotenoid

C30 carotenoid column (250×4.6 mm1·D. S-5 μm, YMC) was used for HPLC analysis. The column temperature was set at 30° C. and the flow rate was 1 mL/min. The mobile phase A was methanol/acetonitrile (3:8, v/v), and the mobile phase B was dichloromethane/N-hexane (1:1, v/v). The elution process was as follows: 0-4.5 min, 10% B; 4.5-6.5 min, 10-30% B; 6.5-23.5 min, 30-50% B; 23.5-25.5 min, 50-10% B; 25.5-30 min, 10% B.

Mass spectrum conditions: APCI ion source, positive and negative ion collection mode, scanning range 100-2200 m/z, spray voltage 4.0 kV, auxiliary gas temperature 400° C., capillary temperature 350° C., nitrogen 2 bar, dryer 4 L/min.

Figure 5:
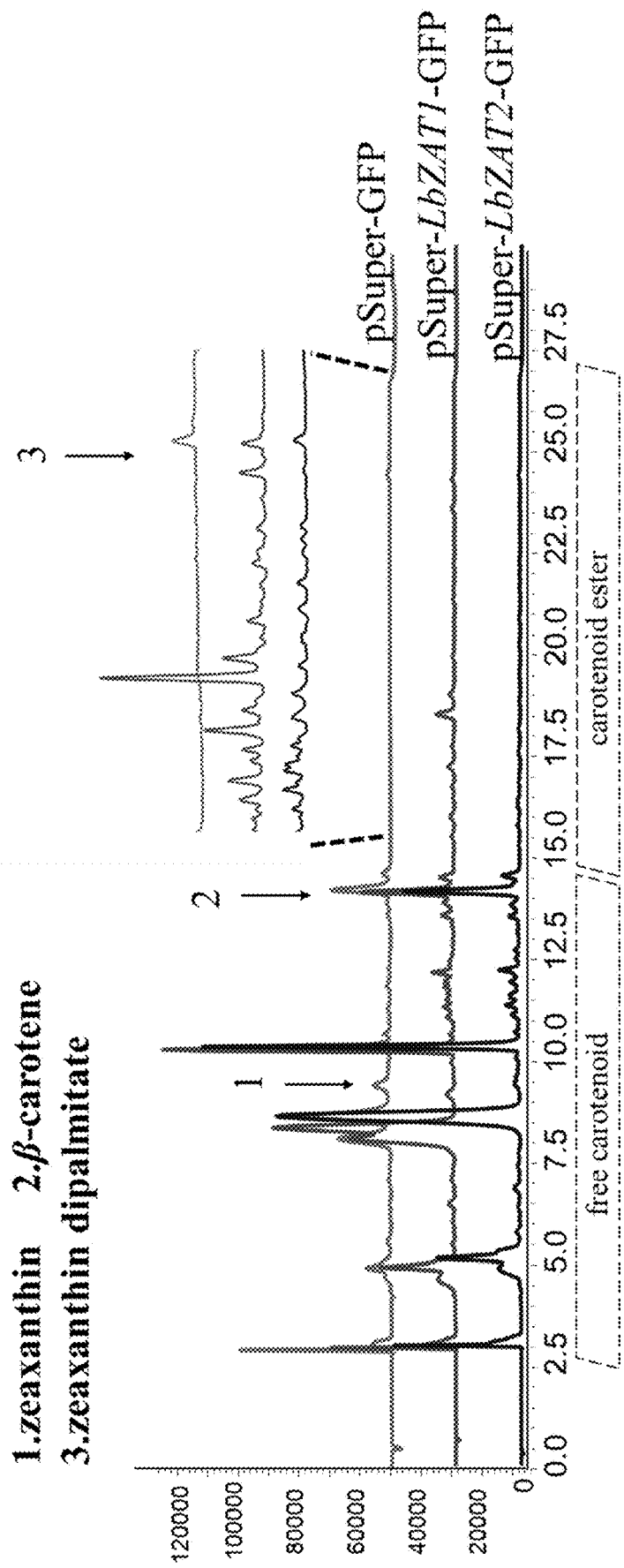
FIG. 5 shows the carotenoid metabolism spectrum of *L. barbarum* transgenic calli in Embodiments 4 of the present disclosure.

The metabolic spectrum of carotenoids is shown in FIG. 5. In the transgenic calli of L. barbarum overexpressing LbZAT1 and LbZAT2 genes, the carotenoid metabolic spectrum has more characteristic absorption peaks of esterified carotenoids than the control group at the peak position of esterified carotenoids.

The results of Embodiment 4 proved that the proteins encoded by LbZAT1 and LbZAT2 genes have the function of catalyzing carotenoid esterification.

The technical features of the embodiments above can be combined arbitrarily. To simplify description, all possible combinations of the technical features of the embodiments above are not described. However, as long as there is no contradiction in the combination of these technical features, they should be considered to be the scope recorded in the description.

The embodiments above express several implementations of the present disclosure only. The description of the embodiments is relatively specific and detailed, but may not therefore be construed as the limitation on the patent scope of the present disclosure. It should be noted that a person of ordinary skill in the art may further make several variations and improvements without departing from the concept of the present disclosure. These variations and improvements all fall within the protection scope of the present disclosure. Therefore, the patent protection scope of the present disclosure shall be defined by the appended claims.

What is claimed is:

1. A method for catalyzing the esterification of plant free carotenoids, comprising the following steps:
   (a) preparing host cells of a plant;
   (b) transforming a nucleic acid molecule encoding a carotenoid esterase into the host cells of (a), wherein the nucleic acid molecule is: the LbZAT1 gene, the nucleotide sequence of which is SEQ ID NO:1 or a nucleic acid sequence encoding the amino acid sequence of SEQ ID NO:4; and
   (c) culturing the transformed host cells of (b) overnight in the dark under humidity suitable to catalyze the esterification of plant free carotenoids.

2. The method for catalyzing the esterification of plant free carotenoids according to claim 1, wherein the plant is medlar, *Arabidopsis*, corn, sorghum, potato, tomato, wheat, rape, soybean, rice, barley or tobacco.

3. A transgenic plant or a renewable part thereof or a calli thereof, wherein the genome comprises a trans-gene encoding a carotenoid esterase protein, wherein the trans-gene encoding the carotenoid esterase protein is the LbZAT1 gene, the nucleotide sequence of which is SEQ ID NO:1, or a nucleic acid sequence encoding the amino acid sequence of SEQ ID NO:4.

4. The transgenic plant or the renewable part thereof or the calli thereof according to claim 3, wherein the transgenic plant is medlar, *Arabidopsis*, corn, sorghum, potato, tomato, wheat, rape, soybean, rice, barley or tobacco.

5. An agent for catalyzing the esterification of plant free carotenoids, comprising:
   (i) an over expression vector comprising a gene encoding carotenoid esterase, or a transient expression vector comprising a gene encoding carotenoid esterase, or
   (ii) cells transformed with a gene encoding carotenoid esterase,
   wherein, the gene encoding the carotenoid esterase of (i)-(ii) is the LbZAT1 gene, the nucleotide sequence of which is SEQ ID NO:1, or a nucleic acid sequence encoding the amino acid sequence of SEQ ID NO:4.

6. The agent for catalyzing the esterification of plant free carotenoids according to claim 5, wherein the agent catalyzes the esterification of free carotenoids in a plant, and wherein the plant is medlar, *Arabidopsis*, corn, sorghum, potato, tomato, wheat, rape, soybean, rice, barley or tobacco.

* * * * *

SEQUENCE LISTING

```
Sequence total quantity: 12
SEQ ID NO: 1            moltype = DNA   length = 2124
FEATURE                 Location/Qualifiers
source                  1..2124
                        mol_type = other DNA
                        organism = synthetic construct
SEQUENCE: 1
atggtttctc ttccgcaaaa tttctgggca gcccctcatt ttgctcgtca cccaggctat    60
aagcctcagt gtatatctcg aatcacatgc ttagctagca gggactccac attttgcct   120
tcagattctg ttaaagttaa tggtgtgtcc tctattgagg aaaaggagaa aagtatccct   180
gtagttgatg tgcaaaatga tcatttggat aagagcaagg aggacatgcg aaacaagttg   240
gaacccctt gggatgatga atatgaact caaactgtta aggattatct tgagatagga   300
ttggagatta ttaagcccga tggaggtcct ccgcggtggt ttactcccat atcagctggt   360
cctccttgc aagaatctcc tctcctactt tttctgcctg gaacggatgg cactggcatg   420
ggtcttgttt tgcatgaaaa ggctcttggg aaagttttc aggtttggtg cttgcatatt   480
cctgtgtatg atcgaacacc gtttgacgaa ctggtgaatt ttgtcgagag aactgtgagg   540
ctgaagcacg cttcatctcc aaacaagcca atttatttag ttggagattc atttggaggg   600
tgcttggctc ttgctgttgc tgctcataac cctaagattg accttgttct gatattagtt   660
aatccagcaa cttcctttgg gaagtcacag ctccaacctc tgcttcctct tctagagtct   720
ttgcctgatg aaattcatgt tatggtccct tatcttatga gctttattat gggtgatcca   780
atgaagatgg cgatggttaa cattgattcc atgcttcctc ctggacaaat tattcgacgt   840
ctctctgaca acctcactag tttgctggcc taccctcctg gcttagctga tatcataccg   900
aaggaaactc ttctctggaa gttgaagctt cttagatctg cttcatctta ttcaaattcc   960
cgcctccatg ctgttaacgc tgaagtactt gtgattgcta gtggcaagga taacatgttt  1020
ccaagtggag atgaagctca gaggcttgca aattcattaa gaaactgcaa agtacaatac  1080
ttcaaagaca atgcgcatac tattttattg gaagatggta ttaatctgct atccatcatc  1140
aaaggtacta gcaaatatcg tcgtaaaaaa aggcatgatc ctgtcatgga tttttcttctt  1200
cctactatgt cagagttcaa gaacacaatc caggactata gttggtatct caattttact  1260
ggtcctgtta tgctgtccac actggaaaat gggaaaattg taagaggtct agcagggtc  1320
ccacgtgaag gccctgtatt gttggtcggt tatcacatgc ttatgggttt agattctatc  1380
cctctcgttc tagaatgttt gaggcagagg aaaatttac ttcgtggtat agcacatccg  1440
```

```
gtattgttta ctcagcggac cgagagtcga actaatgaaa gctcattcaa tgatctgttg   1500
agactatctg gatttatgcc tgtcagtgcc agcaacettt ttaagttgct tgcaacaaag   1560
tcacacatte tgctgtatcc tggtggtgcc cgtgaggcct acatcgtaa ggagaagag     1620
tacaaggtga tttggcctga ccaaccgaa ttcatcagaa tggcagcaaa atttggtgcg    1680
acaattgtgc cgtttggggt tgtaggggaa gatgatatag cacagttagt tctcgactat   1740
gacgacctaa aaaatattcc tatattgggt gatgggataa ggtattataa cgaacatgca   1800
gcgaggagtg gtttaacagt caggacggac atggacgagg aggtcgccaa ccaagcactg   1860
tatctcccgg gtgttttacc taagataccg ggtcgttttt actacttgtt tggaaaacct   1920
attcacacaa agggaaggaa ggacctggtg aaagacagag agaaagcaag agaattgtac   1980
ttgcaggtaa aatctgaagt tcaaaataac atgaattatt tgcttaagaa aagagaggag   2040
gatccttacc gaagcgtcat tgatcggacc gtgcataaag cattttctgc aacgtttgat   2100
gatgtcccaa catttgatta ttaa                                          2124

SEQ ID NO: 2            moltype = DNA  length = 2016
FEATURE                 Location/Qualifiers
source                  1..2016
                        mol_type = other DNA
                        organism = synthetic construct
SEQUENCE: 2
atggctgctg gcgcttacac ggcggccggt gtttcgccgc tgctccaata tcggaactca    60
tcatgcctcc acgtcagatt caattatttg gtgcgtgcat cacaaccgcc agcacagatg   120
acgcctgctc tgtcgagcaa caagggaagc agcaactcca taaccgagaa aacaagtttg   180
attatgaaag attacatgga atggagcaag gatatgattg gctccggtgg gccaccacgc   240
tggttttccc cctggagtg cggtccacct atcaaagact cccctctctt gctctattta   300
ccagggatta tggtattgg acttggcctt ataaagcatc acagaagact tggaaggatc   360
ttcaatatat ggtgtctcca tgttccagtt acagatcgaa catcgttctc agacctggtg   420
cacctggttg aagcaactgt taggtcagag aatcaccatg caccaagacg tcccatctat   480
cttcttggag aatcttttgg cggatgtcta gcacttgctg ttgctgctcg taatccacat   540
attgatcttg ctctaatttt gtcaaaccca gccacgtt tacgggagtc tcagctgcaa    600
aatctgataa cgttgtcaga agtcattcct gagcaacttc atccaagcat ggttaaaatg   660
ctaagtgtga ctacaggtgt tcctgcaagg gtggcagtgg caattcctgg cagcgtacac   720
cctttgcaac aagcagcagc agagtatttt cgtggtgatg tagcattttc atcctactta   780
tctgtgctga ctgatgtgtt acctgtagga acacttatct ggcggctgaa gatgctcaaa   840
gcagccgcag ctttttgtag ttcccgcctc catgctgtca aagcacaaac tctggtactt   900
tcgagcggaa aggatcactt gatacccagc cttgaggaat ctgagaagct tcatcagatg   960
cttccaaact gtgagatccg gagatttaat aacagtggtc atgtccttct cctgaaagca  1020
gactttaatt tggtaactgt catgacgggc gccaattttt atcgacgtgg aagcaccctt  1080
gacttcgtca cagattttgt gccgccaagc acttctgagt ttgacaacgt gtataaaccg  1140
tacaggtgga tggaagttgc cttcaaccct gtgatgatat caactctcga aaatgggaat  1200
gttgttcggg gtctgactgg aattcctact gaaggcccag tcttacttgt tggttatcac  1260
atgatgcttg gacttgaact agttcctttg gtgtcccgtt tgtggaatga acataagatt  1320
gtcctacgag gcatagcaca tccattgatg tttaagagag caagagtggg aaatatgcct  1380
gcgttatcaa tgtatgatga ttaccgattt atgggtgac ttcccgtgtc ggcaactaac  1440
ttctataaac ttttatcatc aaaatcccac atgttgctgt atcccggggg catgcgggaa  1500
gctcttcacc ggaaggggga ggagtacaaa tgttctggc cagaacagtc tgaatttgtc  1560
agaatggcag ctagatttgg agctaaaatt ataccttttg gttcagtggg agaagatgat  1620
attggccaga tgctccttga ttacgatgac ctgatgaaga ttccctattt caaggctggc  1680
atagaggagt taactggtca agtggagaag ctaagaaatg cactgaagg agaggtttca   1740
aaccaagatg tacatcttcc aatcattctt ccaaaagttc ctggtcgttt ttacttctac   1800
ttcggcaagc caattgaaac agaagggagg aaggaggaac taaaaagcag ggagaaagca   1860
catgaattat acttggaagt gaagtctgag gttgagagat gcattggtta cctgaaggag   1920
aaaagagaaa aagatccgta taggagcatc atggcccgcc tcccttacca ggctagccat   1980
ggctttgatt ctgaagttcc cacatttgac ctatag                             2016

SEQ ID NO: 3            moltype = DNA  length = 2133
FEATURE                 Location/Qualifiers
source                  1..2133
                        mol_type = other DNA
                        organism = synthetic construct
SEQUENCE: 3
atggcttctc ttctgcaaaa tttctgggca gccctcgtt ttgcttttag cccagactat     60
aagcctcagt gtatagctcg aaccacgtgc ttagctagca gggattccac attattgtct   120
tcagattctg ttaacggtgt gccctctatt caggaaaagg agaaagtag cccaatagct   180
gatgtggaaa acggtcgtct ggcttcacct attaaggaga agacaaggga ggatattcaa   240
aacaagttgg aacccctttg ggatgatgga tatggaactc aaactgttaa ggattaccttt  300
gagataggat cggagattat aaagcccgat ggaggtcctc cgcggtggtt tactcccata   360
tcagctggcc ctcctttgga agactctcct ctcctcctt ttctgcctgg aatggatggt    420
actggaaatg gtcttgtttt gcatgagaag gctcttggga agttttca ggtttggtgc    480
ttgcatatte ctgtgtatga tcgaacaccg tttgacgaag tggtgaaatt tgtcgagaga  540
actgtgaggt tgaagcatgc ttcatctcca aacaagccaa tttatttagt tggagattca   600
cttgagggt gctggctct tgctgttgct gtcataatc taagattga ccttgttctg      660
atattagcta atccagctac ttcatttggc aggacacaac tccaacctct gcttcctctt   720
ctagagtctt tgcctgatga aattcatgtt acggtccat atctactgag ctttgttatg   780
ggtgatccaa tgaagatggc gatggttaac attgattca tgtcctccac tggacaaaatt   840
attcaacgtc tctctgacaa cctcactggt ttgctggcaa acctctcgg cttagctgat   900
atcataccga ggaaaactct tctctggaag ttgaagcttc ttagatctgc ttcatcttat   960
tcaaattccc gcctccatgc tgttaatgct gaagtacttg tgattgctag tggcaaggat  1020
aacatgcttc aagtggagaa tgaagctcag aggcttgcaa attcattaag aaactgcaaa  1080
gtacgatact caaagacaa tgggcatact atttattgg aagatggat taatctgcta   1140
```

```
accatcatca aaagtactag caaatatcgt cgttcgaaaa ggcacgatta tgtcatggat    1200
tttctgcctc ctagtgagtc agaattcaag aacgcactca aggacaatag atggtatctc    1260
aattttacta gtccagttat gctgtccaca atggaaaatg ggaaaattgt aagaggtcta    1320
gcaggggtcc catgtgaagg ccctgtgttg ttggtcggtt atcacatgct tatgggatta    1380
gaaattaccc ctcttgtttc agaatatttg aggcagagga aaattttact tcgtgggtata   1440
gcacatccga cattgtttac tcagatgact gagagtcaaa ctaatgaaag ctcattcact    1500
gatgtgctga gactatatgg agctacgcct gtcagtgcca gcaacttctt taagttgctt    1560
gcaacaaagt cacatgttct gctgtatcct ggtggtgccc gtgaggcctt acatcgtaag    1620
ggagaagagt acaaggcgat ttggcctgat caaccagaat tcatcagaat ggctgcaagg    1680
tttggtgcga caattgtgcc atttgggggtt gtagggggaag atgatatagc acagttagtt    1740
ctcgactatg acgacctaaa aaatattcct atagtgggtg atcggataag gcgtgataac    1800
gaacaggcag ccaggagggg tttagcagtc agggcggaca tggacgggga ggttgccaac    1860
caagcgctgt atctccccggg cctttttacct aagatacccg tcgttttta ctacttgttt    1920
ggaaaaccta ttcatacgaa gggaaggaag gacctggtga aagacggaa gaaagcaaga    1980
gaattgtact tgcgggtaaa atctgaagtt caaaataaca tgaattattt gcttaagaaa    2040
agagaggagg atccttaccg aagcgtcatt gatcggaccg tgcataaagc attttctgca    2100
acgtttaatg atgtcccaac atttgattat tag                                  2133

SEQ ID NO: 4              moltype = AA    length = 707
FEATURE                   Location/Qualifiers
source                    1..707
                          mol_type = protein
                          organism = synthetic construct
SEQUENCE: 4
MVSLPQNFWA APHFARHPGY KPQCISRITC LASRDSTFLP SDSVKVNGVS SIEEKEKSIP      60
VVDVQNDHLD KSKEDMRNKL EPLWDDGYGT QTVKDYLEIG LEIIKPDGGP PRWFTPISAG    120
PPLQESPLLL FLPGTDGTGM GLVLHEKALG KVFQVWCLHI PVYDRTPFDE LVNFVERTVR    180
LKHASSPNKP IYLVGDSFGG CLALAVAAHN PKIDLVLILV NPATSFGKSQ LQPLLPLLES    240
LPDEIHVMVP YLMSFIMGDP MKMAMVNIDS MLPPGQIIRR LSDNLTSLLA YLPGLADIIP    300
KETLLWKLKL LRSASSYSNS RLHAVNAEVL VIASGKDNMF PSGDEAQRLA NSLRNCKVQY    360
FKDNAHTILL EDGINLLSII KGTSKYRRKK RHDPVMDFLL PTMSEFKNTI QDYSWYLNFT    420
GPVMLSTLEN GKIVRGLAGV PREGPVLLVG YHMLMGLDSI PLVLECLRQR KILLRGIAHP    480
VLFTQRTESR TNESSFNDLL RLSGFMPVSA SNLFKLLATK SHILLYPGGA REALHRKGEE    540
YKVIWPDQPE FIRMAAKFGA TIVPPFGVVGE DDIAQLVLYD DDLKNIPILG DGIRYYNEHA    600
ARSGLTVRTD MDEEVANQAL YLPGVLPKIP GRFYYLFGKP IHTKGRKDLV KDREKARELY    660
LQVKSEVQNN MNYLLKKREE DPYRSVIDRT VHKAFSATFD DVPTFDY                  707

SEQ ID NO: 5              moltype = AA    length = 671
FEATURE                   Location/Qualifiers
source                    1..671
                          mol_type = protein
                          organism = synthetic construct
SEQUENCE: 5
MAAGAYTAAG VSPLLQYRNS SCLHVRFNYL VRASQPPAQM TPALSSNKGS SNSITEKTSL     60
IMKDYMEWSK DMIGSGGPPR WFSPLECGPP IKDSPLLLYL PGIDGIGLGL IKHHRRLGRI    120
FNIWCLHVPV TDRTSFSDLV HLVEATVRSE NHHAPRRPIY LLGESFGGCL ALAVAARNPH    180
IDLALILSNP ATRLRESQLQ NLITLSEVIP EQLHPSMVHM LSVTTGVPAR VAVAIPGSVH    240
PLQQAAAELF RGDVAFSSYL SVLADVLPVG TLIWRLKMLK AAAAFVSSRL HAVKAQTLVL    300
SSGKDHLIPS LEESEKLHQM LPNCEIRRFN NSGHVLLLEA DFNLVTVMTG ANFYRRGRHL    360
DFVTDFVPPS TSEFDNVYKP YRWMEVAFNP VMISTLENGN VVRGLTGIPT EGPVLLGYH     420
MMLGLELVPL VSRLWNEHKI VLRGIAHPLM FKRARVGNMP ALSMYDDYRF MGAVPVSATN    480
FYKLLSSKSH MLLYPGGMRE ALHRKGEEYK LFWPEQSEFV RMAARFGAKI IPFGSVGEDD    540
IGQMLLDYDD LMKIPYFKAG IEEELTGQVEK LRNDTEGEVS NQDVHLPIIL PKVPGRFYFY    600
FGKPIETEGR KEELKSREKA HELYLEVKSE VERCIGYLKE KREKDPYRSI MARLPYQASH    660
GFDSEVPTFD L                                                          671

SEQ ID NO: 6              moltype = AA    length = 710
FEATURE                   Location/Qualifiers
source                    1..710
                          mol_type = protein
                          organism = synthetic construct
SEQUENCE: 6
MASLLQNFWA APRFAFSPDY KPQCIARTTC LASRDSTLLS SDSVNGVPSI QEKEKSSPIA     60
DVENGRLASP IKEKSKEDIQ NKLEPLWDDG YGTQTVKDYL EIGSEIIKPD GGPPRWFTPI    120
SAGPPPLEDSP LLLFLPGMDG TGMGLVLHEK ALGKVFQVWC LHIPVYDRTP FDELVKFVER    180
TVRLKHASSP NKPIYLVGDS LGGCLALAVA AHNPKIDLVL ILANPATSFG RTQLQPLLPL    240
LESLPDEIHV TVPYLLSFVM GDPMKMAMVN IDSMLPPGQI IQRLSDNLTG LLAHLSGLAD    300
IIPKETLLWK LKLLRSASSY SNSRLHAVNA EVLVIASGEQ NMLPSGDEAQ RLANSLRNCK    360
VRYFKDNGHT ILLEDGINLL TIIKSTSKYR RSKRHDYVMD FLPPSESEFK NALKDNRWYL    420
NFTSPVMLST MENGKIVRGL AGVPCEGPVL LVGYHMLMGL EITPLVSEYL RQRKILLRGI    480
AHPTLFTQMT ESQTNESSFT DVLRLYGATP VSASNFFKLL ATKSHVLLYP GGAREALHRK    540
GEEYKAIWPD QPEFIRMAAR FGATIVPFGV VGEDDIAQLV LDYDDLKNIP IVGDRIRRDN    600
EQAARRGLAV RADMDGEVAN QALYLPGLLP KIPGRFYYLF GKPIHTKGRK DLVKDREKAR    660
ELYLRVKSEV QNNMNYLLKK REEDPYRSVI DRTVHKAFSA TFNDVPTFDY                710

SEQ ID NO: 7              moltype = DNA    length = 25
FEATURE                   Location/Qualifiers
source                    1..25
                          mol_type = other DNA
```

```
                        organism = synthetic construct
SEQUENCE: 7
gcgtcgacat ggtttctctt ccgca                                              25

SEQ ID NO: 8            moltype = DNA  length = 29
FEATURE                 Location/Qualifiers
source                  1..29
                        mol_type = other DNA
                        organism = synthetic construct
SEQUENCE: 8
ggggtaccat aatcaaatgt tgggacatc                                          29

SEQ ID NO: 9            moltype = DNA  length = 23
FEATURE                 Location/Qualifiers
source                  1..23
                        mol_type = other DNA
                        organism = synthetic construct
SEQUENCE: 9
gcgtcgacat ggctgctggc gct                                                23

SEQ ID NO: 10           moltype = DNA  length = 29
FEATURE                 Location/Qualifiers
source                  1..29
                        mol_type = other DNA
                        organism = synthetic construct
SEQUENCE: 10
ggggtaccta ggtcaaatgt gggaacttc                                          29

SEQ ID NO: 11           moltype = DNA  length = 24
FEATURE                 Location/Qualifiers
source                  1..24
                        mol_type = other DNA
                        organism = synthetic construct
SEQUENCE: 11
gcgtcgacat ggcttctctt ctgc                                               24

SEQ ID NO: 12           moltype = DNA  length = 28
FEATURE                 Location/Qualifiers
source                  1..28
                        mol_type = other DNA
                        organism = synthetic construct
SEQUENCE: 12
ggggtaccat aatcaaatgt tgggacat                                           28
```